United States Patent
Rijpers et al.

(10) Patent No.: US 6,861,117 B2
(45) Date of Patent: Mar. 1, 2005

(54) MULTI-STACK OPTICAL DATA STORAGE MEDIUM AND USE OF SUCH MEDIUM

(75) Inventors: Johannes Cornelis Norbertus Rijpers, Eindhoven (NL); Guo-Fu Zhou, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/495,946

(22) PCT Filed: Oct. 24, 2002

(86) PCT No.: PCT/IB02/04487

§ 371 (c)(1),
(2), (4) Date: May 18, 2004

(87) PCT Pub. No.: WO03/044786

PCT Pub. Date: May 30, 2003

(65) Prior Publication Data

US 2005/0003134 A1 Jan. 6, 2005

(30) Foreign Application Priority Data

Nov. 23, 2001 (EP) .............................. 01204534

(51) Int. Cl.$^7$ ................................ B32B 3/02
(52) U.S. Cl. .................... 428/64.1; 428/64.5; 428/64.6; 430/270.13
(58) Field of Search ............... 428/64.1, 64.4, 428/64.5, 64.6, 913; 430/270.13, 495.1, 945

(56) References Cited

U.S. PATENT DOCUMENTS 6,231,945 B1 * 5/2001 Miyamoto et al. ......... 428/64.1
6,296,915 B1 * 10/2001 Yusu et al. ................ 428/64.1
6,641,887 B2 * 11/2003 Iida et al. .................. 428/64.1

\* cited by examiner

*Primary Examiner*—Elizabeth Mulvaney
(74) *Attorney, Agent, or Firm*—Edward W. Goodman

(57) ABSTRACT

A description is given of multi-stack optical data storage medium (20) for rewritable recording by means of a focused laser-light beam (30), said medium (20) having a substrate (1) with deposited on a side thereof: a first recording slick (2) comprising a phase-change type recording layer (6)- at least one further recording stack (3) comprising a phase-change type recording layer (12),- a transparent spacer layer (9) adjacent each further recording stack (3). The further recording stack (3) is sufficiently transmissive to ensure proper sensitivity for reading and recording in the first recording stack (2). For this purpose, at least one heat sink layer (10) made of HfNx, and 1.1=x=1.6, is present in at least one of the recording stacks (3). The heat sink layer (10) further ensure proper cooling behavior of the recording layer (12) of the further recording stack (3) in order to obtain sufficient recording performance in the further recording stack (3).

10 Claims, 5 Drawing Sheets

MULTI-STACK OPTICAL DATA STORAGE MEDIUM AND USE OF SUCH MEDIUM

The invention relates to a multi-stack optical data storage medium for rewritable recording by means of a focused laser-light beam, said medium having a substrate with deposited on a side thereof:
- a first recording stack comprising a phase-change type recording layer, said first recording stack being present most remote for the focused laser-light beam,
- at least one further recording stack comprising a phase-change type recording layer,
- a transparent spacer layer between the recording stacks, said transparent spacer layer having a thickness larger than the depth of focus of the focused laser-light beam.

The invention also relates to the use of such a multi-stack optical data storage medium for high data rate recording applications.

An embodiment of an optical data storage medium of the type mentioned in the opening paragraph is known from U.S. Pat. No. 6,190,750, filed by Applicants.

An optical data storage medium based on the phase-change principle is attractive, because it combines the possibilities of direct overwrite (DOW) and high storage density with easy compatibility with read-only optical data storage systems. Data storage, in this context, includes digital video-, digital audio- and software-data storage. Phase-change optical recording involves the formation of submicrometer-sized amorphous recording marks in a crystalline recording layer using a focused relatively high power laser-light beam. During recording of information, the medium is moved with respect to the focused laser-light beam that is modulated in accordance with the information to be recorded. Marks are formed when the high power laser-light beam melts the crystalline recording layer. When the laser-light beam is switched off and/or subsequently moved relatively to the recording layer, quenching of the molten marks takes place in the recording layer, leaving an amorphous information mark in the exposed areas of the recording layer that remains crystalline in the unexposed areas. Erasure of written amorphous marks is realized by recrystallization through heating with the same laser at a lower power level, without melting the recording layer. The amorphous marks represent the data bits, which can be read, e.g. via the substrate, by a relatively low-power focused laser-light beam. Reflection differences of the amorphous marks with respect to the crystalline recording layer being about a modulated laser-light beam which is subsequently converted by a detector into a modulated photocurrent in accordance with the recorded information.

One of the most important requirements in phase-change optical recording is a high data rate, which means that data can be written and rewritten in the medium with a user data rate of at least 30Mbits/s. Such a high data rate requires the recording layer to have a high crystallization speed, i.e. a short crystallization time, during DOW. To ensure that previously recorded amorphous marks can be recrystallized during DOW, the recording layer must have a proper crystallization speed to match the velocity of the medium relative to the laser-light beam. If the crystallization speed is not high enough the amorphous marks from the previous recording, representing old data, cannot be completely erased, meaning recrystallized, during DOW. This causes a high noise level. A high crystallization speed is particularly required in high-density recording and high data rate optical recording media, such as in disk-shaped CD-RW high speed, DVD-RW, DVD+RW, DVD-RAM, DVR-red and blue which respectively are abbreviations of the known Compact Disk and the new generation high density Digital Versatile or Video Disk+RW and -RAM, where RW and RAM refer to the rewritability of such disks, and Digital Video Recording optical storage disks, where red and blue refer to the used laser wavelength. For these disks, the complete erasure time (CET) has to be lower than 30 ns. CET is defined as the minimum duration of an erasing pulse for complete crystallization of a written amorphous mark in a crystalline environment. The CET is measured with a static tester. For DVD+RW, which has a 4.7 GB recording density per 120 mm disk, a user data-bit rate of 26 Mbits/s is needed, and for DVR-blue said rate is 35 Mbits/s. For high speed versions of DVD+RW and DVR-blue data rates of 50 Mbits/s and higher are required. The data rate for Audio/Video (AV)-applications is determined by the AV-information stream but for computer-data applications no restrictions in data rate apply, i.e. the larger the better. Each of these data bit rates can be translated to a maximum CET which is influenced by several parameters, e.g. thermal design of the recording stacks and the recording layer materials used.

Another important requirement is to increase the storage capacity of optical recording media like DVD-Rewritable and DVR (Digital video Recorder) on a single-sided disk. This can be achieved by reducing the laser-light wavelength $\lambda$, and/or increasing the numerical aperture (NA) of a recording lens, because the laser-light spot size is proportional to $(\lambda/NA)^2$. Because of a smaller laser-light spot size, the marks, which are recorded, are smaller. Therefore, the storage capacity of a disk increases because more marks fit per unit area of the disk. An alternative option is the application of multiple recording stacks, which are optically accessed from the same side of the optical disk with the same laser-light beam. When more than two recording stacks on the same side of the optical disk are used, it is called multi-stack recording. When the multi-stack comprises two recording stacks, this feature is also called dual- or double-stack recording.

For dual- or double-stack recording, the second recording stack, through which the laser-light beam enters first, must be sufficiently transmissive to ensure proper read/write characteristics of the first recording stack. Said known medium of U.S. Pat. No. 6,190,750 has a $|IP_2IM_2I^+|S|IP_1IM_1|$ structure for rewritable phase-change recording which has two metal reflective layers $M_1$ and $M_2$, which respectively are relatively thick, with a high optical reflection, and relatively thin, with a relatively high optical transmission. I represents a dielectric layer, $I^+$ represents a further dielectric layer. $P_1$ and $P_2$ represent phase-change recording layers, and S represents a transparent spacer layer. In this structure the laser-light beam enters first through the stack containing $P_2$. The metal layers not only serve as a reflective layer, but also as a heat sink to ensure rapid cooling for quenching the amorphous phase during writing. The $P_1$ layer is present proximate a relatively thick metal mirror layer $M_1$ which causes substantial cooling of the $P_1$ layer during recording while the $P_2$ layer is present proximate a relatively thin metal layer $M_2$ with limited heat sink properties. The cooling behavior of a recording layer determines to a large extent the correct formation of amorphous marks during recording. Sufficient heat sink action is required in order to ensure proper amorphous mark formation during recording.

In the known medium, the metal layer $M_2$ inevitably blocks a substantial part of the laser-light causing a reduced recording power at the $P_1$ layer. A further dielectric layer $I^+$ is used, in combination with the layer $M_2$, in order to increase the transmission of the $M_2$ layer. The metal layer $M_2$ is required for sufficient heat sink action. The thermal conductivity of this further dielectric layer alone still appears to be too low, and therefore its ability to rapidly reduce the temperature in the recording layer is insufficient. Because of the partial blocking of the laser-light a substantially higher laser-light write power for the $P_1$ recording layer is required. This means that a relatively large amount of laser-light power is needed in order to successfully write or rewrite data in the optical data storage medium, especially at high data rates which require a larger medium speed relatively to the laser-light beam. At larger write and rewrite speeds, more laser-light power is needed. In most cases, semiconductor lasers are used for generating the laser-light beam. Especially at shorter laser light wavelengths, e.g. lower than 700 nm, the maximum laser power of those lasers is limited and poses a barrier for high recording powers. Furthermore, large laser-light powers preferably are avoided because further recording stacks adjacent the first recording stack may be undesirably heated by the laser-light beam, which is focused onto the recording layer of the first recording stack. When no metal layer $M_2$ is used the cooling behavior of the layer $P_2$ is substantially different from the cooling behavior of the layer $P_1$. Because of this difference the way of writing at a given data rate in the layer $P_2$ substantially differs from the layer $P_1$. By way of writing, e.g., a pulse or write strategy is meant. It may even be impossible to successfully write in a layer with a relatively slow cooling behavior at a high enough data rate. In other words: the amorphous mark formation is highly counteracted because of the slow cooling rate of the P layer allowing substantial recrystallization.

It is an object of the invention provide a multi-stack optical data storage medium of the kind described in the opening paragraph, in which the recording stack or further recording stack comprises a substantially laser-light transparent layer with sufficient heat sink action in order to ensure proper amorphous mark formation in the recording layer of said recording stacks.

This object is achieved in that at least one heat sink layer, comprising a compound represented by the formula $HfN_x$ and in which formula x is the number of atoms N per Hf atom and $1.1 \leq x \leq 1.6$, is present in at least one of the recording stacks.

The invention is based on the insight that the transmission of an IPIT stack almost solely is determined by the transmission of the P layer. T represents the heat sink layer and I and P respectively represent a dielectric layer and a phase-change recording layer. A metal layer, which inevitably blocks a part of the laser-light, is absent. Due to the presence of the heat sink layer sufficient heat sink action is present in the recording stack. It was found that when $HfN_x$ with $1.1 \leq x \leq 1.6$ is used as the material for the heat sink a transparent layer is obtained with a surprisingly high thermal conductivity. When the value of x becomes lower than 1.1 the absorption of the material for laser light becomes too high, resulting in a too low transmission of the $HfN_x$ layer. When the value of x becomes higher than 1.6 the stress content of the layer becomes unacceptably high and cracks in the heat sink layer and warpage of the substrate may occur. As a result of the invention the laser-light power for writing in subjacent recording stacks is reduced considerably, e.g. by amounts up to about 50%.

In non-prepublished European patent application nr. 01202089.7 (PHNL010374), filed by Applicants, Indium Tin Oxide (ITO) is described as a transparent heat sink material with a relatively high thermal conductivity compared to standard transparent dielectric layers made of e.g. $(ZnS)_{80}(SiO_2)_{20}$. It has been found that the $HfN_x$ compound according to the invention has a strongly improved thermal conductivity compared to ITO.

In an embodiment of the optical data storage medium according to the invention the heat sink layer is present in at least one of the further recording stacks at a side of the recording layer of the further recording stack closest to the first recording stack adjacent a transparent spacer layer. Schematically the following structure may represent the embodiment: $|IP_n IT_n|S_n|IP_{n-1}IT_{n-1}|S_{n-1}| \ldots |IP_1 I|$. The laser-light enters first through the $n^{th}$ stack. The $IP_1 I$ stack is the first recording stack, $S_n$ is a transparent spacer layer, $IP_n IT_n$ is the $n^{th}$ recording stack, and wherein I, P and T have the above mentioned meaning. It should be mentioned that many notations of the order of multi-stack design are possible. Sometimes multi-stack designs are represented by $L_n$ in which n denotes 0 or a positive integer number. The first stack through which the laser-light enters is called $L_0$, while each deeper stack is represented by $L_1, L_n$. Deeper is to be understood in terms of the direction of the incoming laser-light beam. In this document another notation is used in which the deepest stack has subscript number 1.

In another embodiment a further heat sink layer, comprising a compound represented by the formula $NfN_y$ and in which formula y is the number of atoms N per Hf atom and $1.1 \leq x \leq 1.6$, is present in the further recording stack containing the heat sink layer, the further heat sink layer being present at a side of the recording layer of the further recording stack opposite from the side of the heat sink layer. It should be noted that the value of x in the compound $HfN_x$ of the further heat sink layer may differ from the value of x in the compound $HfN_x$ of the heat sink layer.

Schematically this embodiment may be represented by the following structure: $|T_n IP_n IT_n|S_n|T_{n-1}IP_{n-1}IT_{n-1}|S_{n-1}| \ldots |IP_1 I|$. In such way, a symmetrical stack may be formed with a heat sink layer on both sides of the recording layer. This has the advantage that the cooling behavior is more symmetrically distributed, which results in a more optical writing and erasing of amorphous marks in the recording layer. Especially favorable are compounds $HfN_x$ wherein $1.2 \leq x \leq 1.3$. In this range a low absorption of the material of the heat sink layer, i.e. the imaginary part of the refractive index is lower than 0.2, is combined with a low mechanical stress content of the heat sink layer after deposition. It has been found that the stress content of the heat sink layer according to the invention has a tendency to increase at higher values of x and y higher than 1.3. When the values of x and y become higher than 1.6 the stress content of the layer may become unacceptably high and cracks in the heat sink layer and warpage of the substrate may occur.

In a favorable embodiment the further heat sink layer is present in the first recording stack at a side of the recording layer of the first recording stack closest to the further recording stack and the heat sink layer is present in the first recording stack at a side of the recording layer of the first recording stack most remote from the further recording stack. When the P layer has sufficient reflectively of itself, the first recording stack may be applied without a normally used metal layer. The cooling behavior of the first recording stack is substantially equal to the cooling behavior of a further recording stack in which heat sink layers may be present in the same configuration. In this way, the write and erase properties of the first and further recording stacks are substantially equal which is advantageous. There is no need to apply different recording strategies for the first recording stack.

In another embodiment the $P_1$ layer may not have sufficient reflection of itself and a metal reflective layer is present in the first recording stack at a side of the recording layer of the first recording stack most remote from the further recording stack in order to enhance the total reflection of the optical data storage medium. Because the first recording stack is the last stack at which the laser-light arrives the metal reflective layer may be non-transparent. Furthermore, the metal layer will act as an excellent heat sink for the first recording stack. For the metal reflective layer of the first recording stack, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa. Ag is preferred because of its high thermal conductivity. The thickness of this metal reflective layer is not critical, but preferably the transmission is zero for obtaining maximal reflection. For practical reasons the thickness is usually not higher than about 100 nm.

Preferably, the heat sink layer has a thickness of a value selected from the range of 5 to 200 nm. A too thin layer does not exhibit sufficient heat sink action while a too thick layer may deteriorate the optical transmission of the recording stacks and may develop cracks or may cause a warpage of the substrate. Furthermore, a thick layer is more expensive to deposit.

In advantageous embodiments the recording layer is in contact with at least one additional layer comprising a compound selected from the group consisting of $Al_2O_3$, SiC, $Si_3N_4$, MgO, ZnO and AlN including their non-stoichiometric compositions, said additional layer having a maximum thickness of 10 nm. These layers increase the crystallization speed of the amorphous marks during DOW, directly resulting in a higher possible data rate. The interface between these layers and the recording layer acts as a nucleation source for crystallization of the amorphous marks. The additional layer has a relatively small thickness. Therefore, the additional layer only has a relatively small influence on the transfer capability of heat in the recording layers to the heat sink layers. In other words, the heat sink action is hardly changed by the additional layer.

The recording layers preferably comprise the elements Ge and Te. The recording layers are of the phase-change type. A phase-change material shows a crystalline-amorphous phase transition. Further useful are compounds of In-Sb-Te, Te-Se-Sb, Ag-In-Sb-Te, Ge-Sb-Te, Ge-In-Sb-Te or Ge-Te. Especially useful are the compounds described in the international patent applications WO 01/13370 and WO 97/50084, both filed by Applicants. The compounds in WO 97/50084 have a composition defined in atomic percentages by the formula:

$Ge_{50x}Sb_{40-40x}Te_{60-10x}$, wherein $0.166 \leq x \leq 0.444$. These compositions are situated on the line connecting the compounds GeTe and $Sb_2Te_3$ in the triangular Ge-Sb-Te composition diagram, and include the stoichiometric compounds $Ge_2Sb_2Te_5$ (x=0.444), $GeSb_2Te_4$ (x=0.286) and $GeSb_4Te_7$ (x=0.166). These compounds show a short crystallization (erasure) time.

The compounds in WO 01/13370 have a composition defined in atomic percentages by the formula:

$Q_a In_b Sb_c Te_d$ (in atomic percentages), wherein
Q is selected from the group consisting of Ag and Ge,
2<a<8
0<b<6
55<c<80
15<d<30 and a+b+c+d=100.

Preferably, the recording layer of a further recording stack has a thickness between 3 and 25 nm. A thicker layer would result in a too low transmission. The recording layer of the first recording stack may be thicker, e.g. between 3 and 50 nm.

In all recording stacks, a dielectric layer at a side of the phase-change recording layer remote from the substrate protects the recording layer from the influence of the generally organic spacer layer and optimizes the optical contrast. In view of this optical contrast, the thickness of this layer is preferably limited to $(70+\lambda/2n)$ nm, wherein $\lambda$ is the wavelength of the laser-light beam, and n is the refractive index of the dielectric layer.

In the first recording stack, the dielectric layer between the recording layer and the preferred metal reflective layer is between 10 and 50 nm, preferably between 20 and 40 nm. When this layer is too thin, the thermal insulation between the recording layer and the metal reflective layer is adversely affected. Therefore, the cooling rate of the recording layer is increased, which leads to poor crystallization process and possibly a poor cyclability. The cooling rate will be decreased by increasing the thickness of the dielectric layer. A relatively thick dielectric layer is preferred in order to increase the sensitivity of recording layer of the first recording stack.

The dielectric layers I are preferably made of a mixture of ZnS and $SiO_2$, e.g. $(ZnS)_{80}(SiO_2)_{20}$. The layers may also be made of $SiO_2$, $Ta_2O_5$, TiO2, ZnS, including their non-stoichiometric compositions.

The transparent spacer layers between the first and further recording stacks have a thickness larger than the depth of focus of the laser-light beam, e.g. 10 $\mu$m. This thickness ensures that the first and second recording stacks are optically decoupled, i.e. a laser-light beam focused on the recording layer of the first recording stack does not read/write information from/onto further recording stacks, and vice versa. In this way, the storage capacity is increased with respect to a single-layered data storage medium. The material of the spacer layer is e.g. a UV-cured acrylate adhesive, in which servotracks may be provided by a replication process.

The substrate of the data storage medium may be transparent for the laser wavelength, and is made, for example, of polycarbonate, polymethyl methacrylate (PMMA), amorphous polyolefin or glass. Transparency of the substrate is only required when the laser-light beam enters the recording stacks via the entrance face of the substrate. In a typical example, the substrate is disk-shaped and has a diameter of 120 mm and a thickness of 0.6 or 1.2 mm. The substrate may be opaque when the laser-light beam enters the stack via the side opposite from the side of the substrate.

The surface of the disk-shaped substrate on the side of the recording stacks is, preferably, provided with a servotrack, which can be scanned optically. This servotrack is often constituted by a spiral-shaped groove and is formed in the substrate by means of a mould during injection molding or pressing. These grooves can be alternatively formed in a replication process in the synthetic resin of the spacer layer, for example, a UV light-curable acrylate.

Optionally, the outermost layer of the stack is screened from the environment by means of a protective layer of, for example a 0.1 mm UV light-cured poly(meth)acrylate (DVR) or a 0.6 mm polycarbonate disk (DVD). The protective layer must be of good optical quality, i.e. substantially free from optical aberrations and substantially uniform in thickness, when the laser-light enters the recording stacks via the protective layer. In this case, obviously, the protective layer is transparent to the laser-light.

Recording and erasing data in the recording layers of the recording stacks may be achieved by using a short-wavelength laser, e.g. with a wavelength of 670 nm (red) to 405 nm (blue) or even shorter.

Both the metal reflective layer, and the dielectric layers can be provided by vacuum deposition.

The heat sink layers according to the invention can be provided by reactive sputtering from a Hf target in a Ar/$N_2$ discharge using an adjustable $N_2$ in-flow in the sputtering chamber. Other suitable methods to provide the heat sink layers are not excluded.

The phase-change recording layer can be applied to the substrate by vacuum deposition. Known vacuum deposition processes are evaporation (E-beam evaporation, resistant heated evaporation from a crucible), sputtering, low pressure Chemical Vapor Deposition (CVD), Ion Plating, Ion Beam Assisted Evaporation, Plasma enhanced CVD. Normal thermal CVD processes are not applicable because of too high reaction temperature.

The invention will be elucidated in greater detail by means of exemplary embodiments and with reference to the accompanying drawings, in which:

FIGS. 1 to 3 each show a schematic cross-sectional view of an embodiment of a multi-stack optical data storage medium in accordance with the invention;

Figure 1:
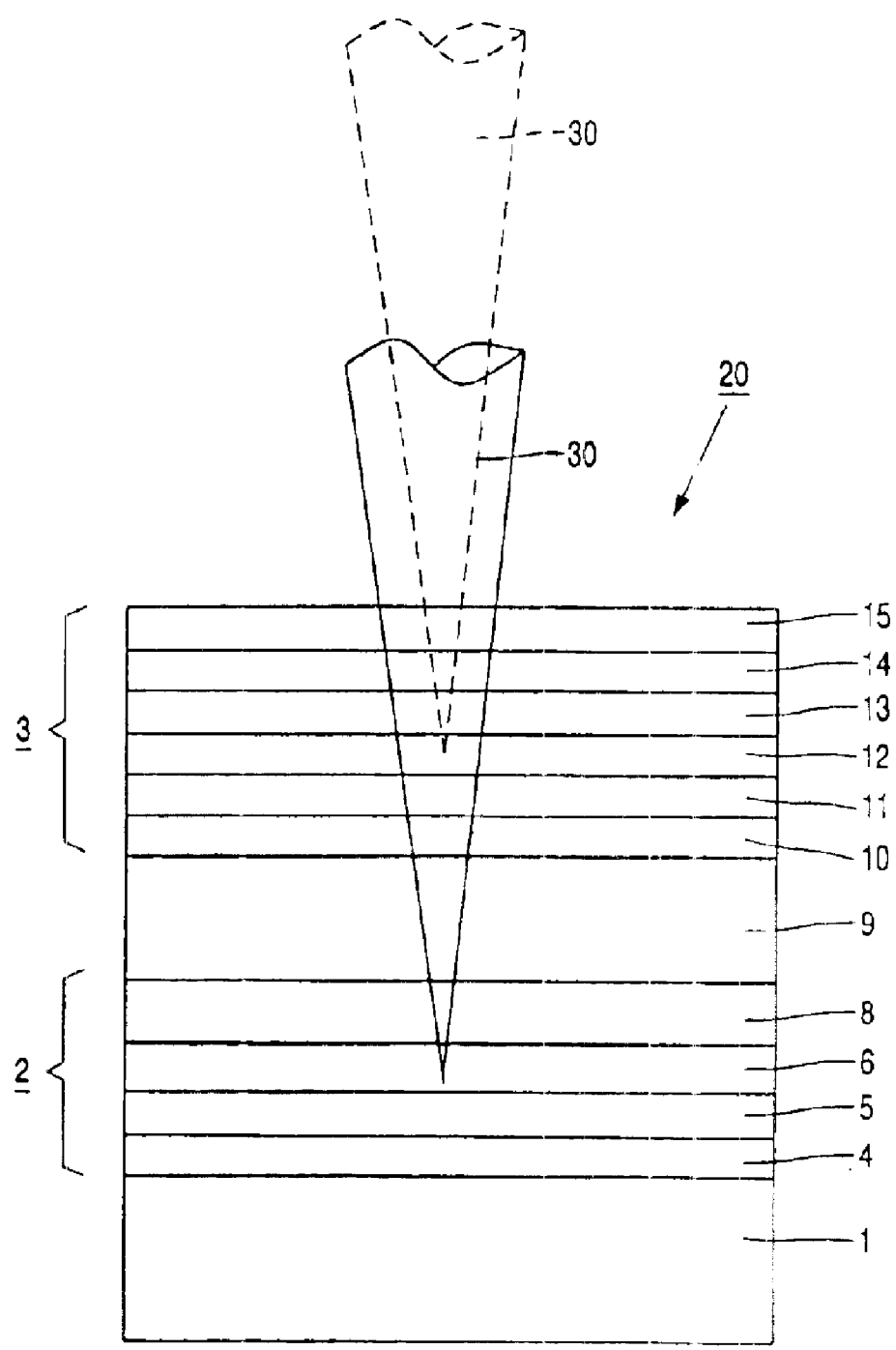

In FIG. 1, an embodiment of the multi-stack optical data storage medium 20 for rewritable recording by means of a focused laser-light beam 30 is shown. The medium has a substrate 1, made of polycarbonate (PC), with deposited on a side thereof:

A first recording stack 2 comprising a phase-change type recording layer 6. The first recording stack 2 is most remote for the focused laser-light beam 30.

A second recording stack 3 comprising a phase-change type recording layer 12.

A transparent spacer layer 9 between the recording stacks 2 and 3. The transparent layer spacer layer 9 has a thickness of 30 µm, which is larger than the depth of focus of the focused laser-light beam 30.

The recording layer 6 of the first recording stack comprises the compound with atomic composition $Ge_{5.0}In5.5Sb_{65.0}Te_{24.5}$ and has a thickness of 10 nm. A metal reflective layer 4 is present in the first recording stack 2 at a side of the recording layer of the first recording stack most remote from the further recording stack 3. The metal reflective layer 4 comprises the metal Ag and has a thickness of 100 nm. A dielectric layer 5, having a thickness of 25 nm, is present between the recording layer 6 and the metal reflective layer 4. The dielectric layer 5 is made of the compound $(ZnS)_{80}(SiO2)_{20}$. A heat sink layer 8 made of $HfN_{1.2}$, having a thickness of 130 nm, is present in the first recording stack at a side closest to the second recording stack 3.

The recording layer 12 of the second recording stack 3 comprises the compound with atomic composition $Ge_{5.0}In_{5.5}Sb_{65.0}Te_{24.5}$ and has a thickness of 6 nm. A heat sink layer 10 made of $HfN_{1.2}$, having a thickness of 80 nm, is present in the second recording stack 3 at a side closest to the first recording stack 2 adjacent the transparent spacer layer 9. A further heat sink layer 14 made of $HfN_{1.2}$, having a thickness of 100 nm, is present in the second recording stack 3 at a side of the recording layer 12 of the second recording stack 3 opposite from the side of the heat sink layer 10. Two dielectric layers 11 and 13, both having a thickness of 20 nm and made of the compound $(ZnS)_{80}(SiO2)_{20}$, are present in contact with the recording layer 12 of the second recording stack 3.

A protective layer 15, made e.g. of a laser-light transparent UV curable resin having a thickness of 100 µm is present adjacent the further heat sink layer 14. Spincoating and subsequent UV curing may provide layer 15. The protective layer 15 may also be provided by applying, e.g., a sheet of polycarbonate (PC) by means of a Pressure Sensitive Adhesive (PSA) layer.

The optical reflection of the first recording stack 2, at a wavelength of 670 nm and when the recording layer 6 is in amorphous phase, is defined as $R_a$ and has a value of 1.4%. The optical reflection of the recording stack 2, at a wavelength of 670 nm and when the recording layer 6 is in the crystalline phase, is defined as $R_c$ and has a value of 28.7%. The optical contrast is 95.2%. The optical contrast is defined as $|R_c-R_a|/R_{max}$ in which formula $R_{max}$ is the maximum value of either $R_c$ and $R_a$. For the second recording stack 3 these values are $R_a$=3.1%, $R_c$=14.4% and an optical contrast of 78.6%. The transmission of the second recording stack 3 at a wavelength of 670 nm is 52.2% ($T_a$) when the recording layer 12 is in the amorphous phase and 39.0% ($T_c$) when the recording layer 12 is in the crystalline phase.

Figure 2:
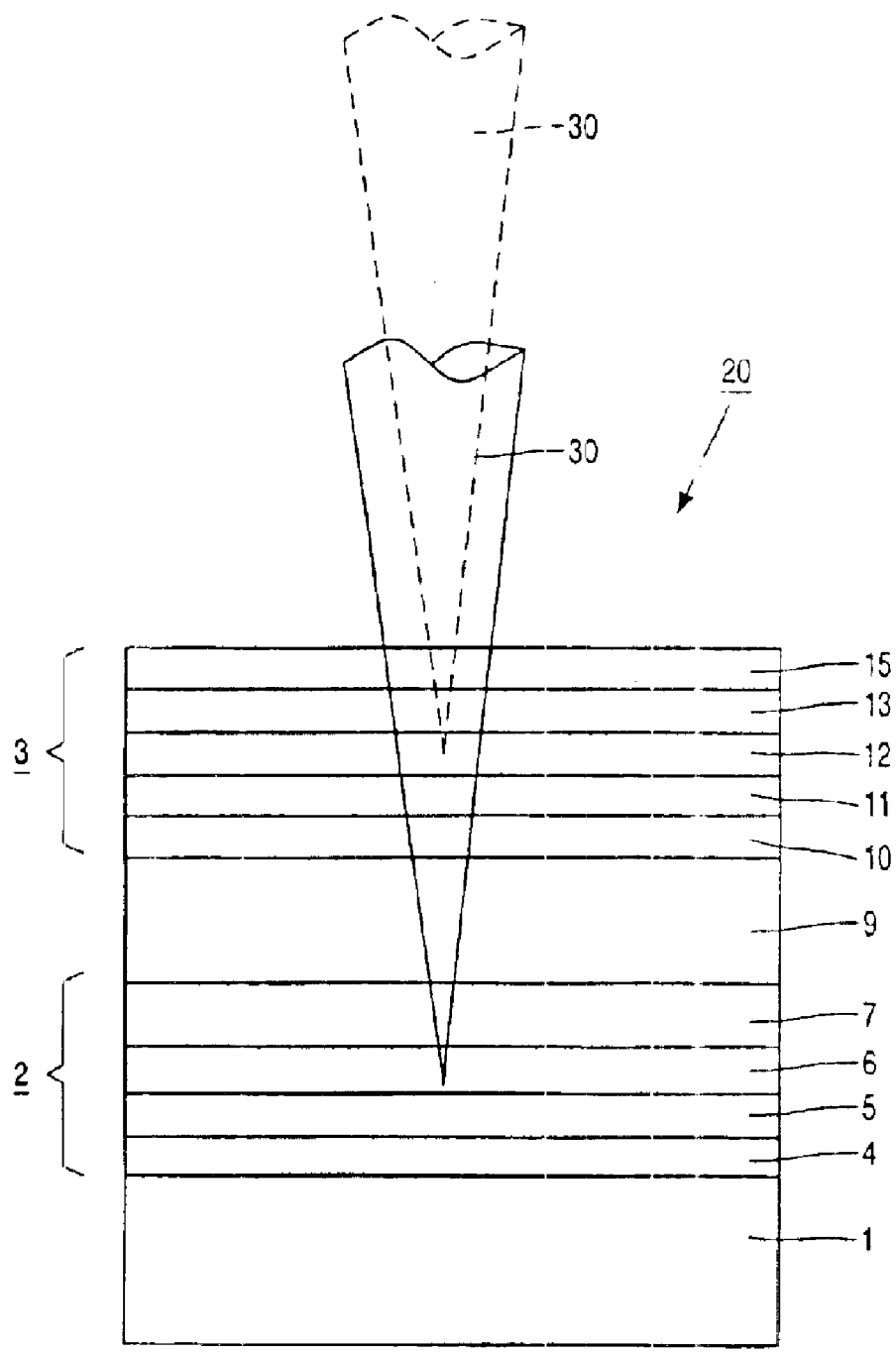

In FIG. 2, another embodiment of the multi-stack optical data storage medium 20 for rewritable recording by means of a focused laser-light beam 30 is shown. Reference numerals of FIG. 2 which are not described here are identical to those of FIG. 1 and already described there. A further dielectric layer 7, having a thickness of 130 nm, is present in the first recording stack 2 at a side closest to the second recording stack 3. The dielectric layer 7 is made of the compound $(ZnS)_{80}(SiO2)_{20}$. A heat sink layer 10 made of $HfN_{1.2}$, having a thickness of 100 nm, is present in the second recording stack 3 at a side closest to the first recording stack 2 adjacent the transparent spacer layer 9. The optical reflection of the first recording stack 2, at a wavelength of 670 nm and when the recording layer 6 is in amorphous phase, is defined as $R_a$ and has a value of 2.0%. The optical reflection of the recording stack 2, at a wavelength of 670 nm and when the recording layer 6 is in the crystalline phase, is defined as $R_c$ and has a value of 30.8%. The optical contrast is 93.5%. The optical contrast is defined above. For the second recording stack 3 the values are $R_a$=4.8%, $R_c$=16.9% and an optical contrast of 72.0%. The transmission of the second recording stack 3 at a wavelength of 670 nm is 51.0% ($T_a$) when the recording layer 12 is in the amorphous phase and 37.5% ($T_c$) when the recording layer 12 is the crystalline phase.

Figure 3:
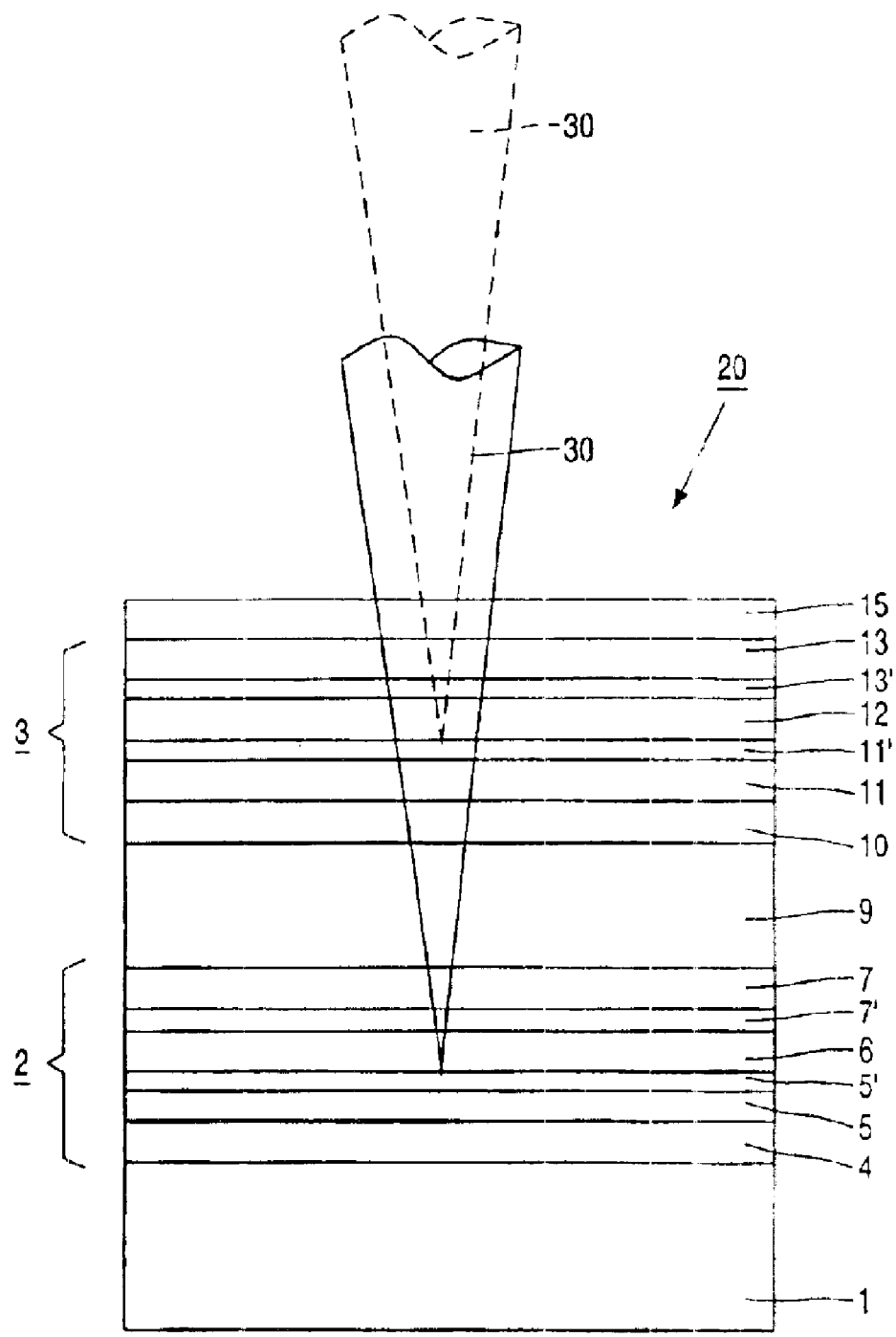

In FIG. 3, another embodiment of the multi-stack optical data storage medium 20 for rewritable recording by means of a focused laser-light beam 30 is shown. Both recording layers 6 and 12 are in contact with four additional layers 5', 7', 11' and 13' made of SiC. The additional SiC layers 5', 7', 11' and 13' all have a thickness of 5 nm. Further layers in FIG. 3 are identical to the corresponding layers in the embodiment in FIG. 2, with the exception that the thickness of each of the dielectric layers 5, 7, 11 and 13 is reduced by 5 nm. This results in a multi-stack optical data storage medium 20 with the same optical reflectivity and transmission as described with FIG. 2. The presence of the SiC layers 5', 7', 11' and 13' in contact with the recording layers 6 and 12 increases the crystallization speed of the recording layers 6 and 12.

Figure 4:
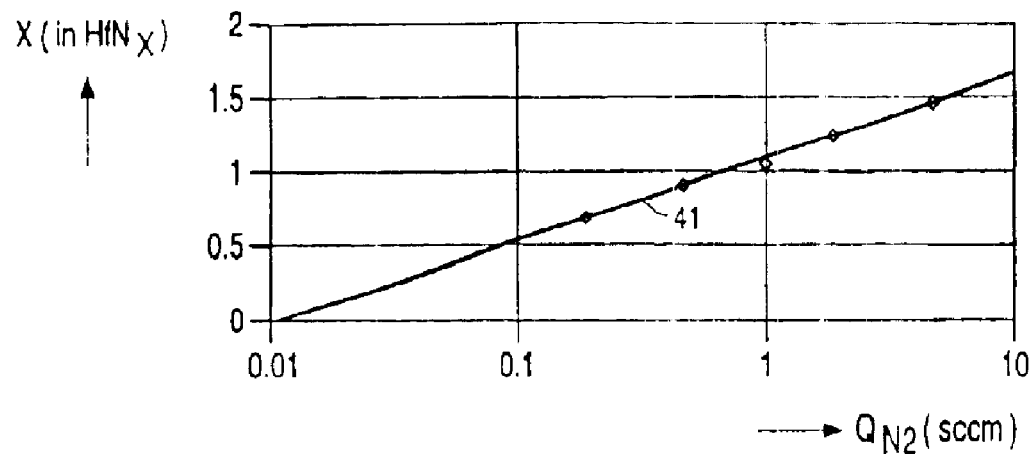
FIG. 4 shows a plot of the value of x in the formula $HfN_x$ as a function of the $N_2$ in-flow $Q_{N2}$ (in sccm) used during sputtering process of the $HfN_x$ layer.

In FIG. 4 the x in the formula $HfN_x$ is plotted as a function of the $N_2$ in-flow $Q_{N2}$ (in sccm) during reactive sputtering from a Hf target in an $Ar/N_2$ discharge. A straight line 41 is fitted through the data points.

Figure 5:
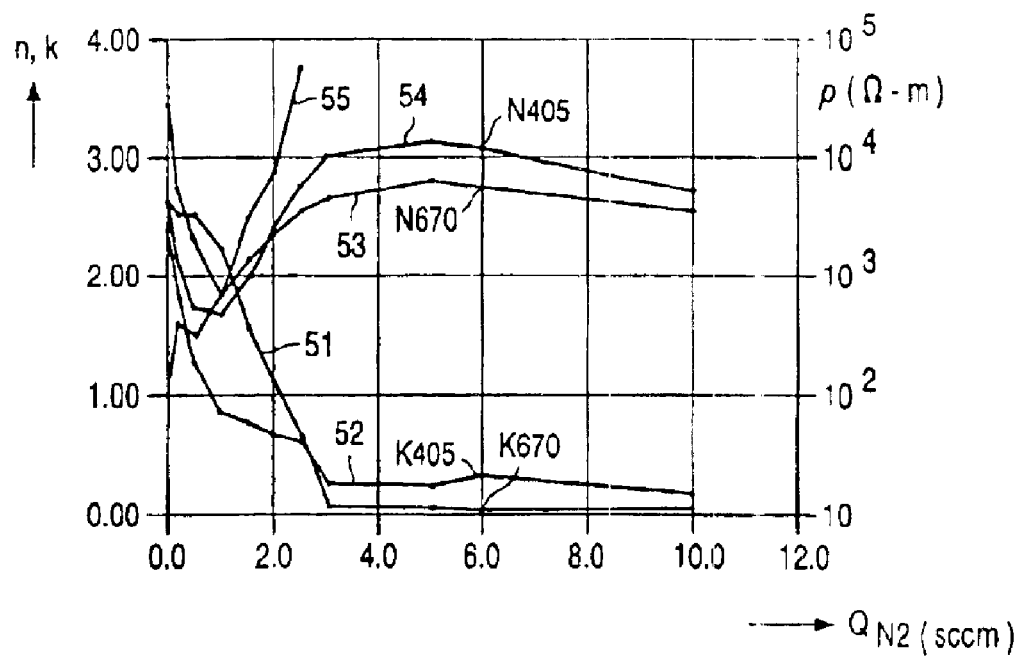
FIG. 5 shows a plot of the real part n and the imaginary part k of the complex index of refraction $\tilde{n}=n-ik$ of the deposited $HfN_x$ layer as a function of the $N_2$ in-flow $Q_{N2}$ (in sccm) used during sputtering process of the $HfN_x$ layer at two different wavelengths $\lambda$=405 nm and $\lambda$=670 nm.

In FIG. 5 it is shown that the absorption k, the imaginary part of the refractive index $\hat{n}=n-ik$, of the deposited $HfN_x$ layer rapidly falls below a value of 0.1 for a wavelength of $\lambda=670$ nm for $N_2$ in-flow values Q of larger than 3.0 sccm. This is represented in curve 51. For $\lambda=405$ nm the absorption is slightly higher and remains at a level of k=0.2, which is represented in curve 52. For completeness, the values of n, which is the real part of refractive index $\hat{n}=n-ik$, at these two different wavelengths $\lambda=670$ and $\lambda=405$ nm nm are shown in curves 53 and 54 respectively. The values of n and k are calculated from the measured reflection and transmission at a chosen wavelength.

Curve 55 represents the electrical conductivity $\rho$ (in $\Omega.m$) of the $HfN_x$ layer, which increases substantially as soon the $HfN_x$ becomes optically transparent, i.e. k=0.2. However, surprisingly, the thermal conductivity does not seem to increase much. Therefore the material $HfN_x$ according to the invention is extremely suitable as a transparent heat sink for use in multi-stack phase change optical recording medium 20.

Figure 6:
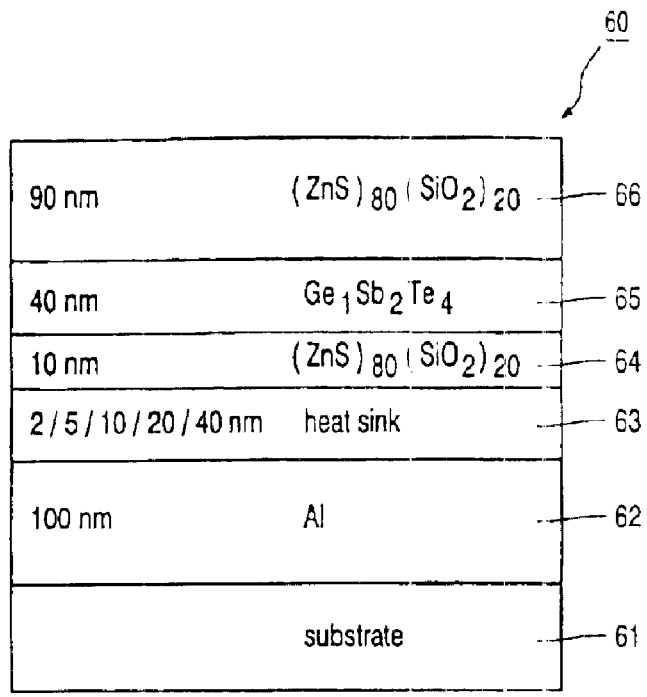
FIG. 6 shows an experimental stack design for determining the capability of thermal conduction of a heat sink layer between a $Ge_1Sb_2Te_4$ recording layer and an aluminium layer.

In FIG. 6 an experimental stack 60 is shown consisting of a substrate 61 made of glass, a 100 nm Al layer 62, a heat sink layer 63 of which the thickness is varied, a 10 nm dielectric layer 64 made of $(ZnS)_{80}(SiO2)_{20}$, a 40 nm phase change recording layer 65 made of $Ge_1Sb_2Te_4$, and a 90 nm dielectric layer 66 made of $(ZnS)_{80}(SiO2)_{20}$. The melt-threshold power $P_1$ (in m W) of the recording layer 65 is determined by measuring the reflection of a stack (P layer is crystalline) as a function of laser-light power. The power at which the reflection starts decreasing (due to amorphization) is defined as $P_1$. The value of $P_1$ is influenced by the cooling power, or heat sink capability, of the adjacent layers 62, 63, 64 and 66. The thermal resistance of the layers between the Al layer 62 and the recording layer 65 determines to what extent the presence of the Al layer 62 is felt by the recording layer 65. So, by determining the $P_t$ of the recording layer 65, indirectly, a measure is obtained of the thermal resistance of the layers 63 and 64. Since the thickness and composition of layer 64 is kept constant it is possible to measure the $P_t$ values for heat sink layers made of different materials and translate these values to thermal resistance.

Figure 7:
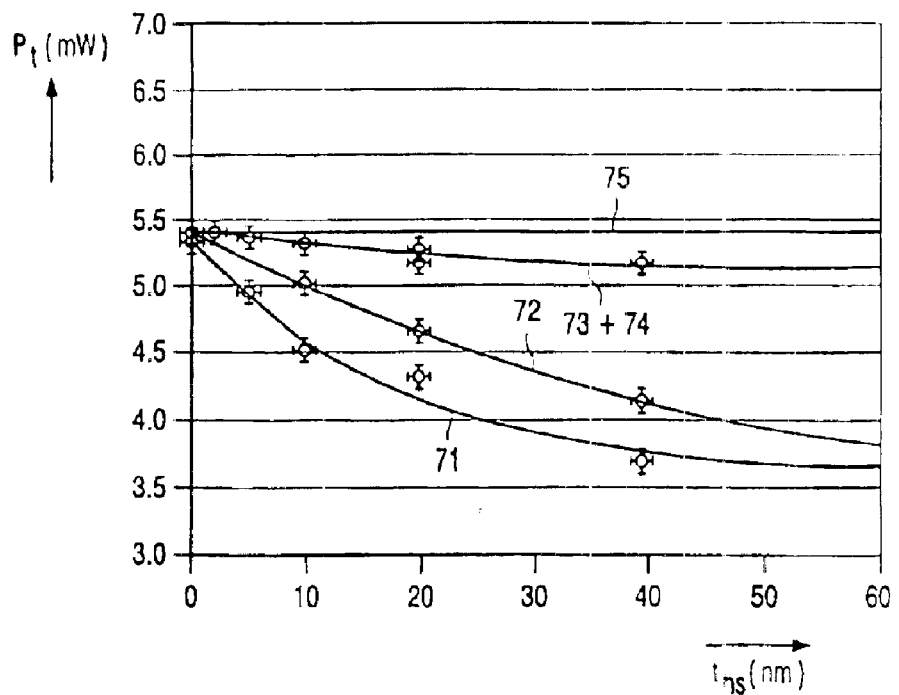
FIG. 7 shows a plot of the melt-threshold power $P_1$ (in mW) of the recording layer of FIG. 6 as a function of the thickness $t_{hs}$ (nm) of different types of heat sink layers.

In FIG. 7 curve 71 is the $P_1$ of the recording layer 65 as a function of the thickness $t_{hs}$ of a heat sink layer 63 made of $(ZnS)_{80}(SiO2)_{20}$. In curve 72 the same dependency is shown using a heat sink layer 63 made of Indium Tin Oxide (ITO). Curves 73 and 74 show the result using a heat sink layers 63 made of $HfN_{1.1}$ and $HfN_{1.2}$ respectively. Finally, curve 75 shows the result for a heat sink layer 63 made of Al. As can be seen, the materials $HfN_{1.1}$ and $HfN_{1.2}$ show $P_1$ values which almost approach the values of pure Al while the values for ITO are much further down from the values of pure Al. This means that these materials $HfN_{1.1}$ and $HfN_{1.2}$, according to the invention, have a thermal conductivity which is close to the thermal conductivity of Al and therefore an excellent cooling behavior or heat sink action is obtained, combined with the advantage of optical transparency.

It should be noted that the above-mentioned embodiments and experimental data illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention, a multi-stack optical data storage medium for rewritable recording by means of a focused laser-light beam is provided. The medium has at least two recording stacks comprising a phase-change type recording layer. The recording stacks other than the recording stack which meets the laser-light beam last have a high transparency for the laser-light beam combined with a good cooling behavior of the recording layer in said stack. This is achieved in that at least one heat sink layer made of $HfN_2$, while $1.1 \leq x \leq 1.6$, is present in at least one of the recording stacks.

What is claimed is:

1. A multi-stack optical data storage medium (20) for rewritable recording by means of a focused laser-light beam (30), said medium (20) having a substrate (1) with deposited on a side thereof:

a first recording stack (2) comprising a phase-change type recording layer (6), said first recording stack (2) being present most remote for the focused laser-light beam (30), at least one further recording stack (3) comprising a phase-change type recording layer (12), a transparent spacer layer (9) between the recording stacks (2, 3), said transparent spacer (9) layer having a thickness larger than the depth of focus of the focused laser-light beam (30), characterized in that at least one heat sink layer (8, 10, 14), comprising a compound represented by the formula $HfN_x$ and in which formula x is the number of atoms N per Hf atom and $1.1 \leq x \leq 1.6$, is present in at least one of the recording stacks (3).

2. An optical data storage medium (20) as claimed in claim 1, wherein the heat sink layer (10) is present in at least one of the further recording stacks at a side of the recording layer of the further recording stack (3) closest to the first recording stack (2) adjacent a transparent spacer layer (9).

3. An optical data storage medium (20) as claimed in claim 1, wherein a further heat sink layer (14), comprising a compound represented by the formula $HfN_x$ and in which formula y is the number of atoms N per Hf atom and $1.1 \leq x \leq 1.6$, is present in the further recording stack (3) containing the heat sink layer (10), the further heat sink layer (14) being present at a side of the recording layer (12) of the further recording stack (3) opposite from the side of the heat sink layer (10).

4. An optical data storage medium (20) as claimed in claim 1, wherein $1.2 \leq x \leq 1.3$.

5. An optical data storage medium (20) as claimed in claim 1, wherein the further heat sink layer (8) is present in the first recording stack (2) at a side of the recording layer (6) of the first recording stack (2) closest to the further recording stack (3) and that the heat sink layer is present in the first recording stack (2) at a side of the recording layer (6) of the first recording stack (2) most remote from the further recording stack (3).

6. An optical data storage medium (20) as claimed in claim 1, wherein a metal reflective layer (4) is present in the first recording stack (2) at a side of the recording layer (6) of the first recording stack (2) most remote from the further recording stack (3).

7. An optical data storage medium (20) as claimed in claim 1, wherein the heat sink layer (10) and the further heat sink layer (8, 14) each have a thickness of a value selected from the range of 5 to 200 nm.

8. An optical data storage medium (20) as claimed in claim 1, wherein the recording layer (6, 12) is in contact with at least one additional layer (5', 7', 11', 13') comprising a compound selected from the group consisting of $Al_2O_3$, SiC, $Si_3N_4$, MgO, ZnO and AlN including their non-stoichiometric compositions, said additional layer (5', 7', 11', 13') having a maximum thickness of 10 nm.

9. An optical data storage medium (20) as claimed in claim 8, wherein the recording layers (6, 12) comprise the elements Ge and Te.

10. Use of an optical data storage medium (20) according to claim 1 for multi-stack and high data rate recording.

\* \* \* \* \*